(12) United States Patent
Setlur et al.

(10) Patent No.: US 6,621,208 B2
(45) Date of Patent: Sep. 16, 2003

(54) QUANTUM-SPLITTING OXIDE-BASED PHOSPHORS, METHOD OF PRODUCING, AND RULES FOR DESIGNING THE SAME

(75) Inventors: Anant Achyut Setlur, Niskayuna, NY (US); Holly Ann Comanzo, Niskayuna, NY (US); Alok Mani Srivastava, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 144 days.

(21) Appl. No.: 09/681,666

(22) Filed: May 18, 2001

(65) Prior Publication Data

US 2002/0171356 A1 Nov. 21, 2002

(51) Int. Cl.[7] .............................. H01J 1/62; C09K 11/63
(52) U.S. Cl. ................................. 313/486; 252/301.4 R; 313/487
(58) Field of Search ..................... 313/485, 486, 313/487; 252/301.4 R

(56) References Cited

U.S. PATENT DOCUMENTS

| | | |
|---|---|---|
| 5,552,082 A | 9/1996 | Srivastava et al. |
| 5,571,415 A | 11/1996 | Clikeman et al. |
| 5,571,451 A | 11/1996 | Srivastava et al. .... 252/301.4 R |
| 5,788,884 A | 8/1998 | Kuwata et al. |
| 6,210,605 B1 * | 4/2001 | Srivastava et al. .... 252/301.4 R |

OTHER PUBLICATIONS

R. Pappalardo, "Calculated Quantum Yields for PhotonCascade Emission (PCE) for Pr3+ and TM3+ in Fluoride Hosts", Journal of Luminescence, 14 (1976) 159–193.

W. W. Piper, J.A. DeLuca and F.S. Ham, "Cascade Fluorescent Decay in Pr3+ –Doped Fluorides: Achievement of a Quantum Yield Greater Than Unity for Emission of Visible Light", Journal of Luminescence, 8 (1974) 344–348.

J.L. Sommerdijk, A. Bril and A.W. de Jager, "Two Photon Luminescence with Ultraviolet Excitation of Trivalent Praseodymium", Journal of Luminescence, 8 (1974) 341–343.

* cited by examiner

Primary Examiner—Sandra O'Shea
Assistant Examiner—Bao Truong
(74) Attorney, Agent, or Firm—Toan P. Vo; Patrick K. Patnode

(57) ABSTRACT

Strontium and strontium calcium aluminates and lanthanum and lanthanum magnesium borates activated with $Pr^{3+}$ and $Mn^{2+}$ exhibit characteristics of quantum-splitting phosphors. Improved quantum efficiency may be obtained by further doping with $Gd^{3+}$. Refined rules for designing quantum-splitting phosphors include the requirement of incorporation of $Gd^{3+}$ and $Mn^{2+}$ in the host lattice for facilitation of energy migration.

18 Claims, 4 Drawing Sheets

QUANTUM-SPLITTING OXIDE-BASED PHOSPHORS, METHOD OF PRODUCING, AND RULES FOR DESIGNING THE SAME

CROSS REFERENCE TO RELATED APPLICATIONS

This patent application is related to patent application Ser. No. 09/681,670, titled "Improved Quantum-Splitting Oxide-Based Phosphors And Method of Producing the Same," filed on May 18, 2001.

FEDERAL RESEARCH STATEMENT

This invention was first conceived or reduced to practice in the performance of work under a contract with the United States Department of Energy, said contract having the contract number of DE-FC26-99FT40632. The United States of America may have certain rights to this invention.

BACKGROUND OF INVENTION

1. Field of the Invention

This invention relates to oxide-based materials that have one application as phosphors. More particularly, the phosphors are oxides doped with $Pr^{3+}$ and $Mn^{2+}$ and exhibit quantum splitting when irradiated with vacuum ultraviolet ("VUV") radiation. This invention also relates to a method of making and rules for designing such quantum-splitting phosphors.

2. Background of the Invention

The conversion of a single ultraviolet ("UV") photon into two visible photons with the result that the quantum efficiency of luminescence exceeds unity is termed quantum splitting. Quantum splitting materials are very desirable for use as phosphors for fighting applications, such as fluorescent lamps. A suitable quantum splitting phosphor can, in principle, produce a significantly brighter fluorescent light source due to higher overall luminous output because it can convert to visible light the part of UV radiation that is not absorbed efficiently by traditional phosphors currently used in commercial fluorescent lamps. Quantum splitting has been demonstrated previously in fluoride- and oxide-based materials. A material comprising 0.1% $Pr^{3+}$ in a matrix of $YF_3$ has been shown to generate more than one visible photon for every absorbed UV photon when excited with radiation having a wavelength of 185 nm. The measured quantum efficiency of this material was 140%, and thus greatly exceeded unity. However, fluoride-based compounds do not have sufficient stability to permit their use as phosphors in fluorescent lamps because they are known to react with mercury vapor that is used in such lamps to provide the UV radiation and form materials that do not exhibit quantum splitting. In addition, producing fluoride-based materials presents a great practical challenge because it involves the use of large quantities of highly reactive and toxic fluorine-based materials.

The applicants recently disclosed oxide-based quantum splitting materials. U.S. Pat. No. 5,552,082 discloses a lanthanum magnesium borate activated with $Pr^{3+}$ ion. U.S. Pat. No. 5,571,451 discloses a strontium magnesium aluminate activated with $Pr^{3+}$ ion and charge compensated with $Mg^{2+}$ ion. Emission spectra of these materials exhibit a large peak at about 405 nm which is characteristic of quantum splitting. However, these materials still exhibit a considerable emission in the UV wavelength range of less than 350 nm. This part of the emission reduces the overall visible light output that otherwise can be higher. Therefore, it is desirable to provide oxide-based quantum-splitting phosphors that have higher quantum efficiency in the visible range than the prior-art quantum splitting materials. It is also desirable to provide more energy-efficient light sources using quantum-splitting phosphors having higher quantum efficiency. It is further desirable to provide method for making and rules for guiding the design of materials having high quantum-splitting capability.

SUMMARY OF INVENTION

The present invention provides oxide-based phosphors doped with at least $Pr^{3+}$ and $Mn^{2+}$ ions, which phosphors exhibit quantum splitting when irradiated with VUV radiation. VUV radiation as used herein is radiation having wavelength shorter than about 215 nm. The oxide phosphors of the present invention are oxides of aluminum or boron having positive counterions selected from Group IIA and IIIA of the Periodic Table. The phosphors of the present invention may be used in mercury vapor discharge lamps to provide energy-efficient light sources.

In one aspect of the present invention, the oxide-based phosphors are strontium aluminates in which strontium may be partially or completely substituted with calcium and which are doped with at least $Pr^{3+}$ and $Mn^{2+}$. Such oxide-based phosphors of the present invention have a composition represented by $Sr_{1-x}Ca_xAl_{12}O_{19}:Pr^{3+},Mn^{2+}$ where $0 \leq x \leq 1$. In this convention, the elements following the colons are the activators in the phosphors.

In another aspect of the present invention, the oxide-based phosphors are also doped with $Gd^{3+}0$ in addition to $Pr^{3+}$ and $Mn^{2+}$.

In still another aspect of the present invention, the oxide-based phosphors are doped with $La^{3+}$ and $Mg^{2+}$ ions for charge compensation and for minimization of the number of vacancies in the lattice.

In another aspect of the present invention, the oxide-based phosphors are lanthanum borate activated with $Pr^{3+}$ and $Mn^{2+}$ in which lanthanum is partially substituted by gadolinium. In addition, the borate phosphors may be doped with $Mg^{2+}$. Such borate phosphors of the present invention have compositions represented by $La_{1-x-y-z}Gd_xPr_yMn_zB_3O_6$ where x is in the range from about 0.005 to about 0.99, y is in the range from about 0.005 to about 0.1, z is in the range from about 0.005 to about 0.5, and $x+y+z<1$. Another borate phosphor of the present invention has a formula of $La_{1-x-y}Gd_xPr_yMg_{1-z}Mn_zB_5O_{10}$ where x is in the range from about 0.005 to about 0.995, y is in the range from about 0.005 to about 0.1, z is in the range from about 0.005 to about 0.5, and $x+y<1$.

The present invention also provides a method of making improved quantum-splitting aluminate or borate phosphors. The aluminate phosphors have a formula of $Sr_{1-x}Ca_xAl_{12}O_{19}:Pr^{3+},Mn^{2+}$ or $Sr_{1-x}Ca_xAl_{12}O_{19}:Pr^{3+},Mn^{2+}$, A; where $0 \leq x \leq 1$, and A is selected from the group consisting of $Gd^{3+}$, $La^{3+}$, $Mg^{2+}$, and combinations thereof. The borate phosphors have a formula of $La_{1-x-y-z}Gd_xPr_yMn_zB_3O_6$ where x is in the range from about 0.005 to about 0.99, y is in the range from about 0.005 to about 0.1, z is in the range from about 0.005 to about 0.5, and $x+y+z<1$ or a formula of $La_{1-x-y-z}Gd_xPr_yMg_{1-z}Mn_zB_5O_{10}$ where x is in the range from about 0.005 to about 0.995, y is in the range from about 0.005 to about 0.1, z is in the range from about 0.005 to about 0.5, and $x+y<1$. The method comprises the steps of selecting a desired final composition of the phosphor; mixing together oxygen-containing compounds of praseodymium and manganese, and materials selected from the group consisting of oxygen-containing compounds of strontium, calcium, aluminum, boron, gadolinium, lanthanum, and magnesium so as to achieve the desired final composition; forming a substantially homogeneous mixture of the selected compounds; and firing the substantially homogeneous mixture in a non-oxidizing atmosphere at a temperature and for a time sufficient to result in the desired composition and to maintain the praseodymium ion in the 3+ valence state and manganese ion in the 2+ valence state.

Other benefits of this invention may become evident upon a perusal of the description and appended claims together with the attached drawings.

DETAILED DESCRIPTION

Figure 1:
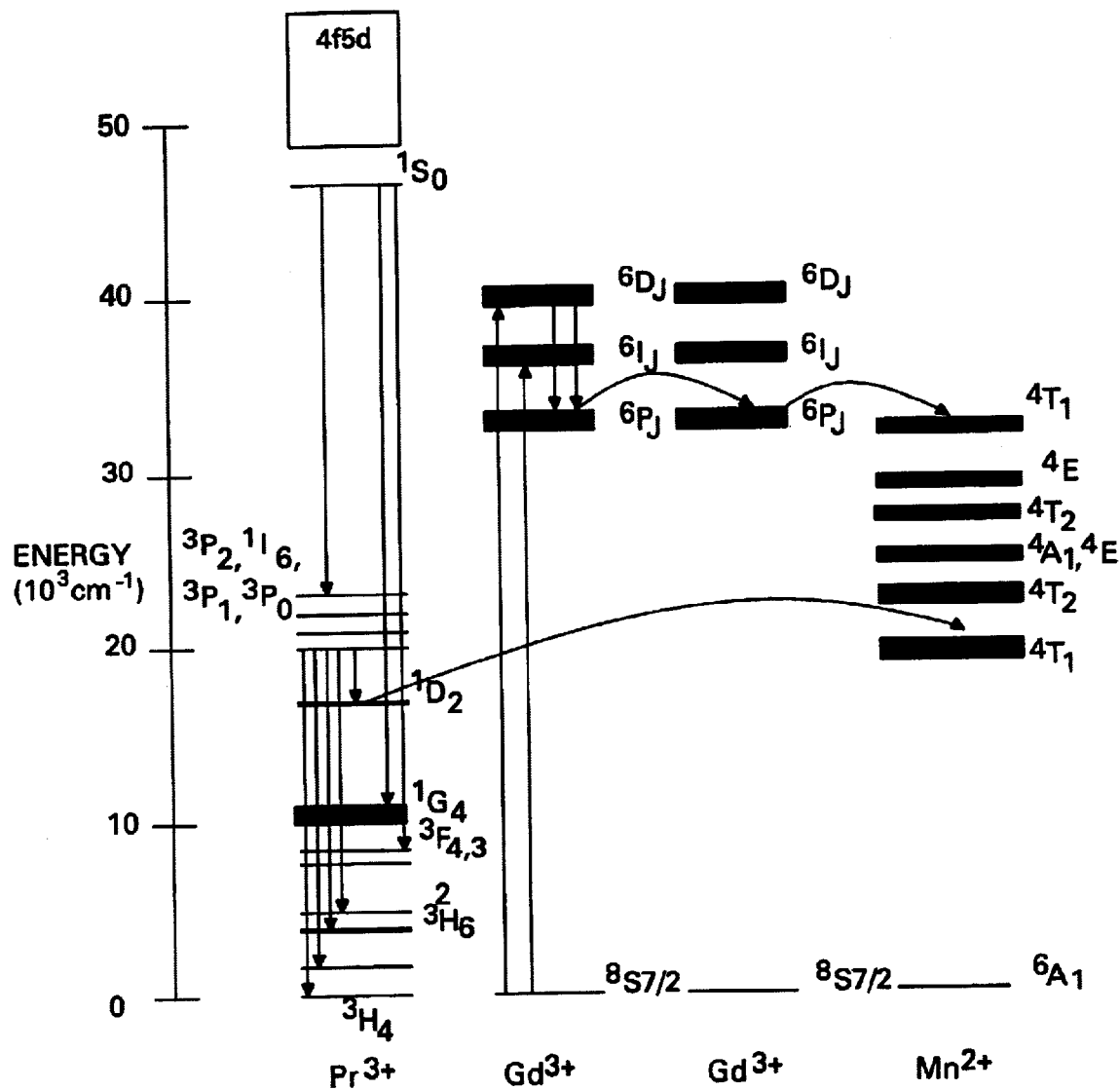
FIG. 1 is a diagram showing energy levels of $Pr^{3+}$, $Gd^{3+}$, and $Mn^{2+}$ ions.

In general, the present invention provides oxide-based phosphors activated with $Pr^{3+}$ and $Mn^{2+}$. More particularly, the phosphors are strontium aluminate and lanthanum borate phosphors activated with at least $Pr^{3+}$ and $Mn^{2+}$ ions. The doping level for $Pr^{3+}$ and $Mn^{2+}$ are typically in the range from about 0.005 to about 0.1 and from about 0.005 to about 0.5, respectively. In addition, the strontium ions of the aluminate phosphors of the present invention may be substituted partially or completely by calcium. In one preferred embodiment of the present invention, the aluminate phosphor is further doped with gadolinium. The preferred doping level for $Gd^{3+}$ is in the range from about 0.005 to about 0.995 depending on the host lattice. In another preferred embodiment of the present invention, the aluminate phosphor is further doped with $La^{3+}$ and $Mg^{2+}$ at sufficient levels for charge compensation and for minimization of the number of vacancies in the lattice. Thus, the aluminate phosphors have a formula of $Sr_{1-x}Ca_xAl_{12}O_{19}:Pr^{3+},Mn^{2+}$ or $Sr_{1-x}Ca_xAl_{12}O_{19}:Pr^{3+},Mn^{2+},A$; where $0 \leq x \leq 1$ and A is at least one selected from the group consisting of $Gd^{3+}$, $La^{3+}$, $Mg^{2+}$, and combinations thereof.

In another preferred embodiment of the present invention, the oxide-based phosphor is a lanthanum borate activated with at least $Pr^{3+}$ and $Mn^{2+}$ in which lanthanum is partially substituted by gadolinium. In addition, the borate phosphor may be doped with $Mg^{2+}$. The lanthanum borate phosphors of the present invention have a formula of $La_{1-x-y-z}Gd_xPr_yMn_zB_3O_6$ where x is in the range from about 0.005 to about 0.5, y is in the range from about 0.005 to about 0.1, z is in the range from about 0.005 to about 0.5, and x+y<1. The applicants have observed that the strontium aluminate phosphors of the present invention exhibit quantum splitting. A lanthanum borate has been shown to possess quantum-splitting capability (U.S. Pat. No. 5,552,082). The lanthanum borates of the present invention also are expected to be quantum splitting and have a higher quantum efficiency than the lanthanum borate of the prior art because a substantial amount of radiation emitted by the $Pr^{3+}$ ion in the UV range can be transferred through $Gd^{3+}$ ions to $Mn^{2+}$ ions where it is re-emitted as visible light.

In general, emission spectra of materials exhibiting quantum-splitting capability show a characteristic peak at about 405 nm, which peak is a result of the first visible photon emitted as the excited $Pr^{3+}$ ion radiatively decays from the $^1S_0$ energy level to the $^1I_6$ energy level. Thus, an examination of the intensity-versus-wavelength spectrum provides a convenient way of determining whether a material would be quantum splitting, as opposed to using the more time-consuming measurement of quantum efficiency.

Without-limitation, the quantum-splitting behavior of phosphors is attributed to the VUV excitation of the $Pr^{3+}$ ion within the oxide lattice. Therefore, oxides of the present invention should be processed so as to maintain praseodymium as $Pr^{3+}$ ion within the oxide lattice.

FIG. 1 shows the energy levels of $Pr^{3+}$, $Gd^{3+}$, and $Mn^{2+}$ ions. Although the applicants do not wish to be bound by any particular theory, it is believed that the quantum-splitting phosphors of the present invention offer higher quantum efficiency than other quantum-splitting phosphors of the prior art because of two reasons. First, any $Pr^{3+}$ ions that non-radiatively relax from the $^3P_0$ energy level to the $^1D_2$ energy level transfer their energy to $Mn^{2+}$ ions, which in turn emit a visible photon. Second, the transitions from the $^1S_0$ energy level of the $Pr^{3+}$ ion in the UV range (i.e., mainly $^1S_0 \rightarrow {}^1G_4$ and $^1S_0 \rightarrow {}^3F_4$) are converted to visible light by a process consisting of successive steps of cross-relaxation with $Gd^{3+}$ ions, energy migration across the $Gd^{3+}$ sublattice, trapping of that energy by $Mn^{2+}$ ions, and emission of visible photon from the excited $Mn^{2+}$ ions. For simplicity, FIG. 1 shows the energy migration over only two $Gd^{3+}$ ions, but it should be appreciated that, in reality, the energy migration may occur over many $Gd^{3+}$ ions.

EXAMPLE

A phosphor having the composition of $(Sr_{0.65}Gd_{0.30}Pr_{0.05})(Al_{11.65}Mn_{0.1}Mg_{0.25})O_{19}$ was produced and tested to show quantum-splitting capability.

The following amounts of strontium, gadolinium, praseodymium, aluminum, manganese, magnesium compounds were mixed together thoroughly:

3.885 g $SrCO_3$ 2.201 g $Gd_2O_3$ 0.345 g $Pr_6O_{11}$ 24.043 g $Al_2O_3$ 0.465 g $MnCO_3$ 0.408 g MgO

The mixture was fired at 1400° C. for 6 hours in an atmosphere generated by reactions products of a coconut charcoal and volatized compounds of the decomposition of the above carbonates and oxides. Then the fired material was reblended and fired at 1100° C. for 6 hours in an atmosphere of 1% (by volume) hydrogen in nitrogen to yield the final phosphor.

Figure 2:
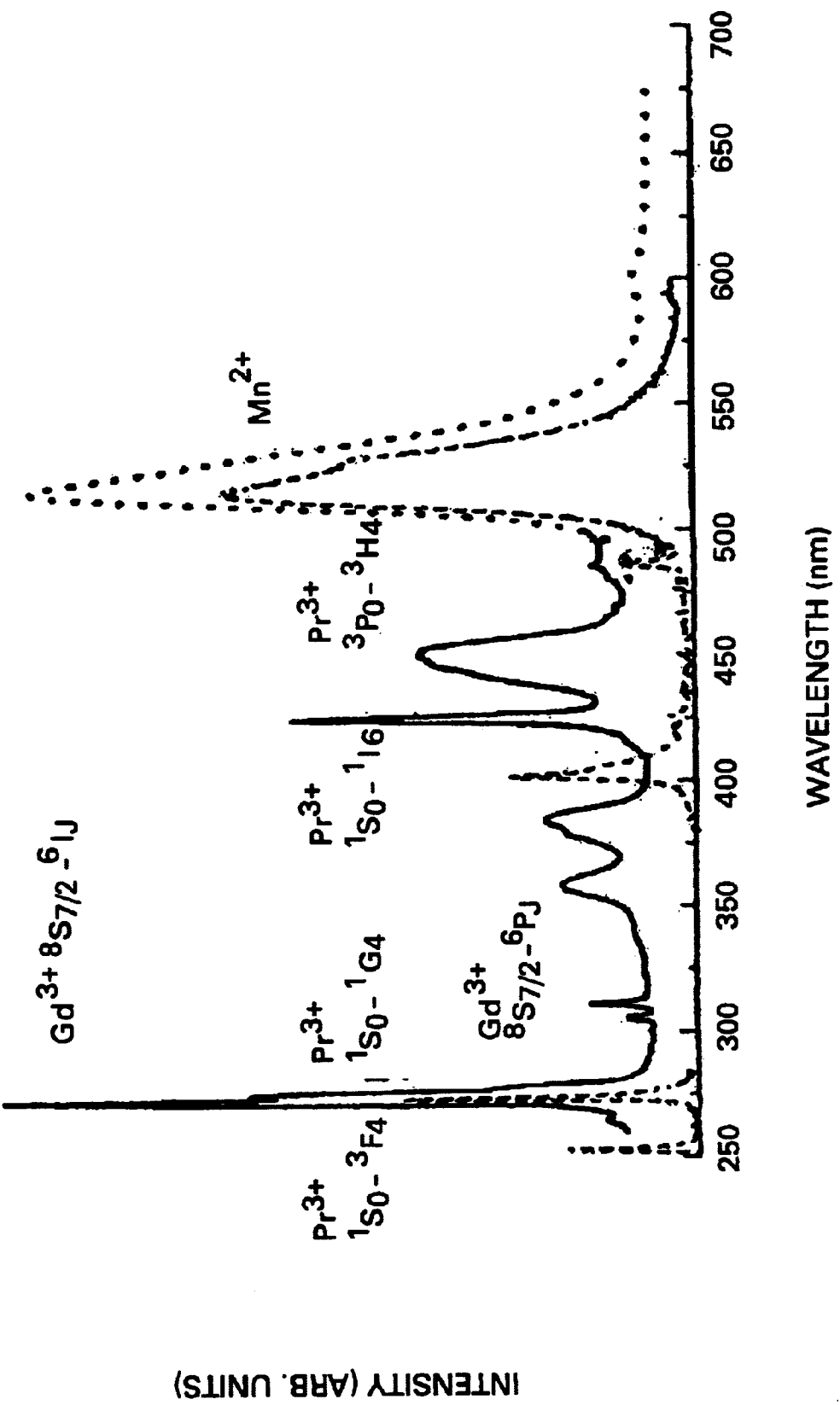
FIG. 2 shows an emission spectrum of strontium aluminate activated by $Pr^{3+}$, $Gd^{3+}$, and $Mn^{2+}$ and an excitation spectrum of $Mn^{2+}$ showing energy absorption by $Gd^{3+}$ and energy transfer between $Gd^{3+}$ and $Mn^{2+}$.
Figure 3:
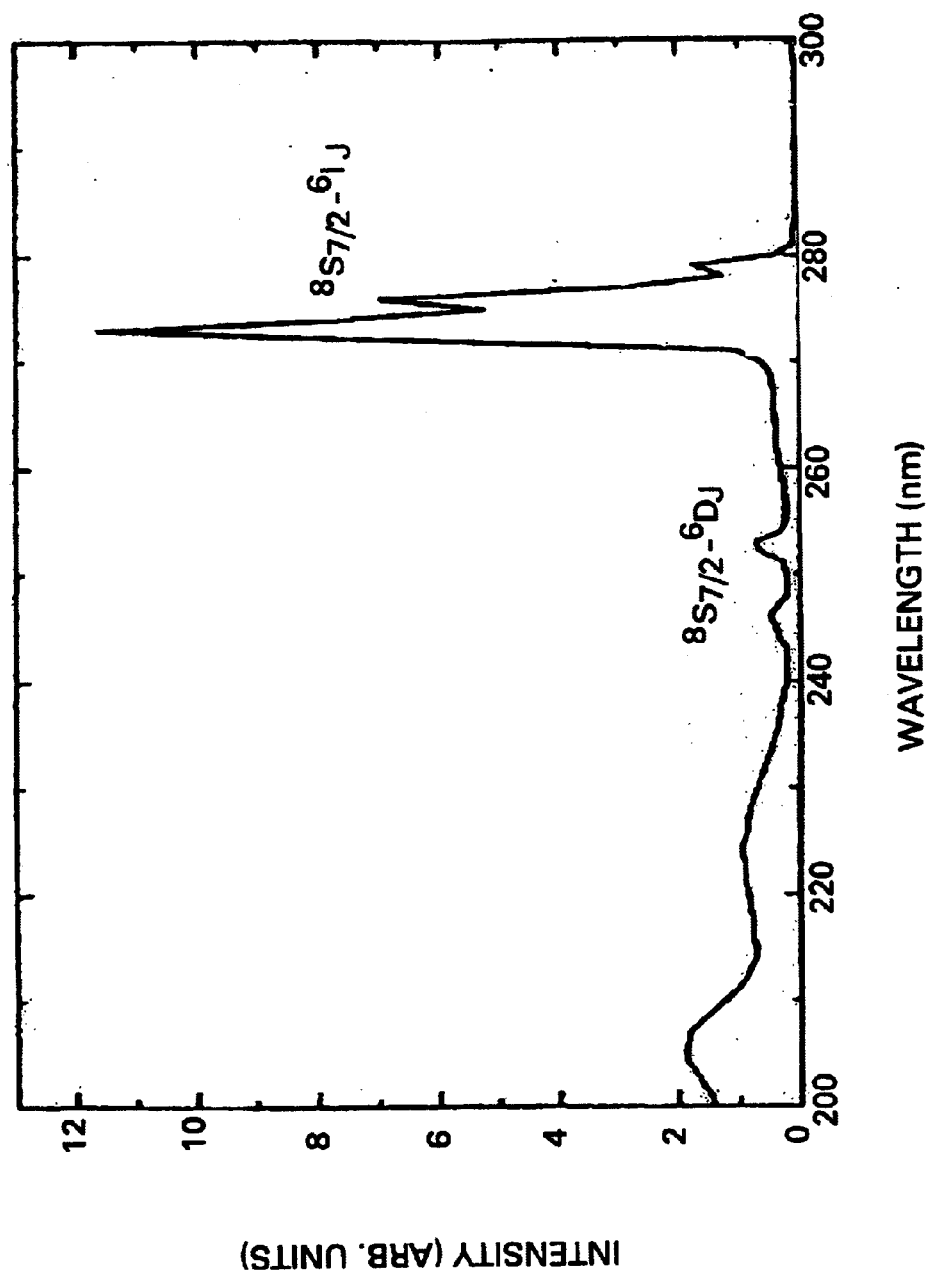
FIG. 3 shows an excitation spectrum of $Gd^{3+}$ in a strontium aluminate activated by $Pr^{3+}$, $Gd^{3+}$, and $Mn^{2+}$.

FIG. 2 shows the emission spectrum of this phosphor (dotted line) upon being excited by VUV radiation at a wavelength of 205 nm. Superimposed on this emission spectrum is the excitation spectrum (solid line) showing a large absorption by $Gd^{3+}$ at about 272–278 nm. This energy is then transferred between the $Gd^{3+}$ and $Mn^{2+}$ ions and subsequently emitted as a visible photon as evidenced by the large peak at about 525 nm. FIG. 3 shows the excitation spectrum of $Gd^{3+}$ ion in the above strontium aluminate phosphor of the present invention. This spectrum shows the large absorption of energy at about 272–278 nm. This peaks substantially coincides with an emission from the radiative decay $^1S_0 \rightarrow {}^1G_4$ of the $Pr^{3+}$ ion. Therefore, this part of the UV emission from the $Pr^{3+}$ ion is converted to visible light with the assistance of the $Gd^{3+}$ ion in the phosphor of the present invention, lending to higher quantum efficiency; i.e., a more efficient use of energy.

From the foregoing discussion, a set of rules may be established for designing quantum-splitting phosphors. It is recognized here that: (1) the $Pr^{3+}$ ion still must excited into the 4f5d energy band and (2) the excited $Pr^{3+}$ must decay into the $^1S_0$ energy level. Therefore, the $Pr^{3+}$ energy position of its 4f5d band must be located above the $^1S_0$ state. However, the 4f5d energy band should not be substantially higher than the $^1S_0$ level so to minimize the loss of energy through the non-radiative decay from the 4f5d band to the $^1S_0$ level. Other rules that are set forth in U.S. Pat. No. 5,788,884 must still hold for an efficient quantum-splitting phosphor. For example, the $Pr^{3+}$ should occupy a site in the host lattice that results in symmetry so that maximum quantum efficiency may be generated by the phosphor. The $Pr^{3+}$-to-oxygen bond distance must exceed about 0.256 nm for quantum splitting to occur. The host lattice must have a band gap greater than about 5 eV so that the excited electrons of the activator are not lost into the conduction band of the host lattice. The present invention further refines the rules to include the necessity to have (1) a substantial amount of gadolinium in the lattice to allow for a significant energy migration among the $Gd^{3+}$ ions and (2) $Mn^{2+}$ codopant to trap energy migrating from $Gd^{3+}$ ions and convert that energy into visible light.

A quantum-splitting phosphor of the present invention is made in a process comprising the steps of: (1) selecting the desired final composition of the phosphor such that the phosphor is activated by at least praseodymium and manganese; (2) mixing together oxygen-containing compounds of praseodymium and manganese and materials selected from the group consisting of oxygen-containing compounds of strontium, calcium, aluminum, boron, gadolinium, lanthanum, and magnesium in quantities so as to achieve the desired final composition of the phosphor; (3) forming a substantially homogeneous mixture of the selected compounds; and (4) firing the substantially homogeneous mixture in a non-oxidizing atmosphere at a temperature and for a time sufficient to result in the desired final composition and to maintain the praseodymium ion in the 3+ valence state and the manganese ion in the 2+ valance state. The oxygen-containing compounds used in the process may be selected from the group consisting of oxides, carbonates, nitrates, sulfates, oxalates; and combinations thereof. The oxygen-containing compounds may be in the hydrated or non-hydrated form. In a preferred embodiment, the non-oxidizing atmosphere is generated from materials selected from the group consisting of carbon monoxide, carbon dioxide, hydrogen, nitrogen, ammonia, hydrazine, amines, and combinations thereof. The firing may be done in any suitable high-temperature equipment in either a batch-wise of a continuous process. The firing may be done isothermally. Alternatively, the process temperature may be ramped from ambient temperature to and then held at the firing temperature. The firing temperature is in the range from about 1000° C. to about 2000° C., preferably from about 1200° C. to about 1700° C., more preferably from about 1400° C. to about 1600° C. The firing time should be sufficiently long to convert the mixture to the final desired composition. This time also depends on the quantity of materials being processed and the rate and quantity of non-oxidizing materials conducted through the firing equipment to provide the non-oxidizing atmosphere. A typical firing time is less than 10 hours.

Figure 4:
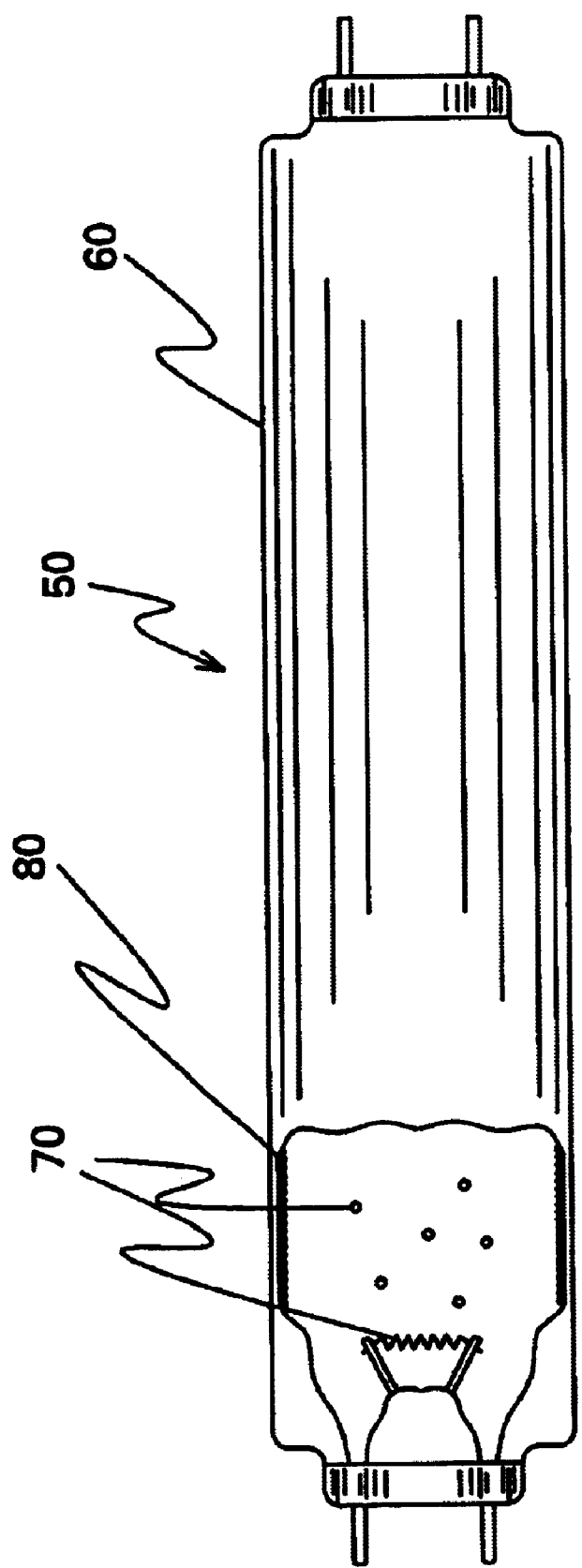
FIG. 4 is a schematic illustration of a lamp incorporating a phosphor of the present invention.

A phosphor of the present invention characterized by quantum-splitting behavior, in VUV radiation and stability with regard to an environment in a mercury discharge device may be utilized as a phosphor in a fluorescent lamp. FIG. 4 shows a lamp 50 comprising an evacuated housing 60, a VUV radiation generating means 70 located within housing 60, and a phosphor 80 located within housing 60 and adapted to be excited by VUV radiation. In a preferred embodiment, lamp 50 is a fluorescent lamp and evacuated housing 60 comprises an evacuated glass tube and associated end caps 62. VUV generating means 70 is a combination of mercury vapor and means for generating high-energy electrons to create a mercury vapor discharge to excite the phosphor. The means for generating high-energy electrons may be a filament of a metal having a low work function, such as tungsten, or such a filament coated with alkali earth metal oxides as are known in the art. The filament is coupled to a high-voltage source to generate electrons from the surface thereof. A quantum-splitting phosphor of the present invention may be used in combination with other conventional phosphors used in fluorescent lighting technology. For example, a quantum-splitting phosphor of the present invention may be combined with conventional red-emitting and blue-emitting phosphors to produce white light from a mercury discharge lamp. Since the quantum-splitting phosphor of the present invention is transparent to the mercury 254-nm emission line, it may be coated on top of the conventional phosphor layer in the lamp housing so to absorb substantially the mercury 185-nm emission line.

While specified preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. An oxide-based quantum-splitting phosphor comprising an oxide of boron, at least one positive counterion selected from the group consisting of strontium, calcium, and magnesium; said oxide being doped with $Pr^{3+}$ and $Mn^{2+}$ ions; said phosphor exhibiting a quantum-splitting behavior when irradiated by vacuum ultraviolet radiation.

2. The oxide-based quantum-splitting phosphor of claim 1 further doped with $Gd^{3+}$ ion.

3. An oxide-based quantum-splitting phosphor comprising an oxide of an element selected from the group consisting of aluminum and boron, at least one positive counterion selected from the group consisting of strontium, calcium, and magnesium; said oxide being doped with $Pr^{3+}$ and $Mn^{2+}$ ions; said phosphor exhibiting a quantum-splitting behavior when irradiated by VUV radiation, wherein said oxide-based quantum-splitting phosphor has a formula $Sr_{1-x}Ca_xAl_{12}O_{19}:Pr^{3+},Mn^{2+}$ where $0 \leq x \leq 1$.

4. An oxide-based quantum-splitting phosphor comprising an oxide of an element selected from the group consisting of aluminum and boron, at least one positive counterion selected from the group consisting of strontium, calcium, and magnesium; said oxide being dosed with $Pr^{3+}$ and $Mn^{2+}$ ions; said phosphor exhibiting a quantum-splitting behavior when irradiated by VUV radiation, wherein said oxide-based quantum-splitting phosphor has a formula $Sr_{1-x}Ca_xAl_{12}O_{19}:Pr^{3+},Mn^{2+}$, A where $0 \leq x \leq 1$ and A is at least one selected from the group consisting of $La^{3+}$ and $Mg^{2+}$.

5. The oxide-based quantum-splitting phosphor of claim 4 wherein $Pr^{3+}$ is present at a level from about 0.005 to about 0.1 mole fraction.

6. The oxide-based quantum-splitting phosphor of claim 4 wherein $Mn^{2+}$ is present at a level from about 0.005 to about 0.5 mole fraction.

7. The oxide-based quantum-splitting phosphor of claim 4 further doped with $Gd^{3+}$ ion.

8. The oxide-based quantum-splitting phosphor of claim 7 wherein $Gd^{3+}$ is present at a level from about 0.005 to about 0.5 mole fraction.

9. An oxide-based quantum-splitting phosphor comprising an oxide of an element selected from the group consisting of aluminum and boron, at least one positive counterion selected from the group consisting of strontium, calcium, and magnesium; said oxide being doped with $Pr^{3+}$ and $Mn^{2+}$ ions; said phosphor exhibiting a quantum-splitting behavior when irradiated by VUV radiation, wherein said oxide-based quantum-splitting phosphor has a formula $La_{1-x-y-z}Gd_xPr_yMn_zB_3O_6$ where x is in a range from about 0.005 to about 0.99, y is in a range from about 0.05 to about 0.1, z is a range from about 0.005 to about 0.5; and $x+y+z<1$.

10. An oxide-based quantum-splitting phosphor comprising an oxide of an element selected from the group consisting of aluminum and boron, at least one positive counterion selected from the group consisting of strontium, calcium, and magnesium; said oxide being doped with $Pr^{3+}$ and $Mn^{2+}$ ions; said phosphor exhibiting a quantum-splitting behavior when irradiated by VUV radiation, wherein said oxide-based quantum-splitting phosphor has a formula $La_{1-x-y}Gd_xPr_yMg_{1-z}Mn_zB_5O_{10}$ where x is in a range from about 0.005 to about 0.995, y is in a range from about 0.05 to about 0.1, z is a range from about 0.005 to about 0.5; and $x+y<1$.

11. A light source comprising an evacuated housing; a vacuum ultraviolet radiation source located within said housing; and a phosphor located within said housing and adapted to be excited by said vacuum ultraviolet radiation source; said phosphor comprising an oxide-based quantum-splitting phosphor which comprises an oxide of boron, at least one positive counterion selected from the group consisting of strontium, calcium, lanthanum, and magnesium; said oxide being doped with $Pr^{3+}$ and $Mn^{2+}$ ions; said phosphor exhibiting a quantum-splitting behavior when irradiated by said vacuum ultraviolet radiation.

12. The light source of claim 11 further comprising phosphors that emit red and blue visible radiation when excited by UV radiation.

13. The light source of claim 12 wherein light emitted from said light source is white light.

14. A light source comprising an evacuated housing; a vacuum ultraviolet radiation source located within said housing; and a phosphor located within said housing and adapted to be excited by said vacuum ultraviolet radiation source; said phosphor comprising an oxide-based quantum-splitting phosphor which comprises an oxide of an element selected from the group consisting of aluminum and boron, at least one positive counterion selected from the group consisting of strontium, calcium, lanthanum, and magnesium; said oxide being, doped with $Pr^{3+}$ and $Mn^{2+}$ ions; said phosphor exhibiting a quantum-splitting behavior when irradiated by said vacuum ultraviolet radiation; wherein said quantum-splitting phosphor has a formula $Sr_{1-x}Ca_xAl_{12}O_{19}:Pr^{3+}, Mn^{2+}$ where $0 \leq x \leq 1$.

15. The light source of claim 14 wherein said phosphor is further doped with $Gd^{3+}$.

16. A light source comprising an evacuated housing; a vacuum ultraviolet radiation source located within said housing; and a phosphor located within said housing and adapted to be excited by said vacuum ultraviolet radiation source; said phosphor comprising an oxide-based quantum-splitting phosphor which comprises an oxide of an element selected from the group consisting of aluminum and boron, at least one positive counterion selected from the group consisting of strontium, calcium, lanthanum, and magnesium; said oxide being doped with $Pr^{3+}$ and $Mn^{2+}$ ions; said phosphor exhibiting a quantum-slitting behavior when irradiated by said vacuum ultraviolet radiation; wherein said quantum-splitting phosphor has a formula $Sr_{1-x}Ca_xAl_{12}O_{19}:Pr^{3+}, Mn^{2+}, A$ where $0 \leq x \leq 1$ and A is selected from the group consisting of $La^{3+}$ and $Mg^{2+}$.

17. A light source comprising an evacuated housing; a vacuum ultraviolet radiation source located within said housing; and a phosphor located within said housing and adapted to be excited by said vacuum ultraviolet radiation source; said phosphor comprising an oxide-based quantum-splitting phosphor which comprises an oxide of an element selected from the group consisting of aluminum and boron, at least one positive counterion selected from the group consisting of strontium, calcium, lanthanum, and magnesium; said oxide being doped with $Pr^{3+}$ and $Mn^{2+}$ ions; said phosphor exhibiting a quantum-splitting behavior when irradiated by said vacuum ultraviolet radiation; wherein said phosphor has a formula $La_{1-x-y-z}Gd_xPr_yMn_zB_3O_6$ where x is in a range from about 0.005 to about 0.99, y is in a range from about 0.05 to about 0.1, z is in a range from about 0.005 to about 0.5; and $x+y+z<1$.

18. A light source comprising an evacuated housing; a vacuum ultraviolet radiation source located within said housing; and a phosphor located within said housing and adapted to be excited by said vacuum ultraviolet radiation source; said phosphor comprising an oxide-based quantum-splitting phosphor which comprises an oxide of an element selected from the group consisting of aluminum and boron, at least one positive counterion selected from the group consisting of strontium, calcium, lanthanum, and magnesium; said oxide being doped with $Pr^{3+}$ and $Mn^{2+}$ ions; said phosphor exhibiting a quantum-splitting behavior when irradiated by said vacuum ultraviolet radiation; wherein said phosphor has a formula $La_{1-x-y}Gd_xPr_yMg_{1-z}Mn_zB_5O_{10}$ where x is in a range from about 0.005 to about 0.995, y is in a range from about 0.05 to about 0.1, z is in a range from about 0.005 to about 0.5; and $x+y<1$.

* * * * *